United States Patent [19]

Beér et al.

[11] Patent Number: 5,443,805
[45] Date of Patent: Aug. 22, 1995

[54] REDUCTION OF COMBUSTION EFFLUENT POLLUTANTS

[75] Inventors: Janos M. Beér, Winchester; Maqed A. Toqan, Wellesley, both of Mass.; Alessandro Marotta; Alberto Beretta, both of Milan, Italy

[73] Assignees: Massachusetts Institute of Technology, Cambridge; Eniricerche S.P.A., Italy

[21] Appl. No.: 748,194

[22] Filed: Aug. 21, 1991

[51] Int. Cl.$^6$ .................. C10B 21/00; C10L 1/22
[52] U.S. Cl. .................. 423/235; 423/237; 423/238; 423/239.1; 423/243.02; 423/243.03; 423/244.07
[58] Field of Search .............. 423/235, 244.07, 243.08, 423/238, 239.1, 243.02; 44/417

[56] References Cited

U.S. PATENT DOCUMENTS

| | | | |
|---|---|---|---|
| 3,900,554 | 8/1975 | Lyon | 423/235 |
| 4,095,928 | 6/1978 | Jones et al. | 431/4 |
| 4,116,610 | 9/1978 | Berthiaume | 431/4 |
| 4,123,944 | 7/1980 | Azuhata | 423/235 |
| 4,335,084 | 6/1982 | Brogan | 423/235 |
| 4,600,568 | 7/1986 | Yoon et al. | 423/243 |
| 4,615,871 | 10/1986 | Yoon | 423/242 |
| 4,626,418 | 12/1986 | College et al. | 423/243 |
| 4,642,225 | 2/1987 | Leikert | 423/242 |
| 4,726,940 | 2/1988 | Kobayashi | 423/244 |
| 4,744,962 | 5/1988 | Johnson et al. | 423/235 |
| 4,770,863 | 9/1988 | Epperly et al. | 423/235 |
| 4,777,024 | 10/1988 | Epperly et al. | 423/235 |
| 4,783,325 | 11/1988 | Jones | 423/235 |
| 4,830,839 | 5/1989 | Epperly et al. | 423/239 |
| 4,842,834 | 6/1989 | Burton | 423/235 |
| 4,886,650 | 12/1989 | Perry | 423/235 |
| 4,960,577 | 10/1990 | Torbor et al. | 423/242 |
| 5,116,584 | 5/1992 | Chen et al. | 423/235 |
| 5,118,481 | 6/1992 | Lyon | 423/235 |

FOREIGN PATENT DOCUMENTS

WO80/07004 8/1989 WIPO .
WO90/05000 5/1990 WIPO .

OTHER PUBLICATIONS

Beer, The Hoyt C. Hottel Plenary Lecture, The Combustion Institute, pp. 1–16 (1988) no month available.

Irons et al., "Tailoring Ammonia-Based SNCR For Installation On Power Station Boilers," 1991 Joint Symposium on Stationary Combustion $NO_x$ Control–EPA/EPRI, Mar. 1991.

Teixeira et al., "Widening the Urea Temperature Window," 1991 Joint Symposium on Stationary Combustion $NO_x$ Control–EPA/EPRI, Mar. 1991.

Lyon, R. K. et al., "Discovery and Development of the Thermal $DeNO_x$ Process", Ind. Eng. Chem. Fundam., vol. 25, 1986, pp. 19–24 no month available.

Lyon, R. K., "Thermal $DeNO_x$", Environ. Sci. Technol., vol. 21, No. 3, 1987, pp. 231–236 no month available.

Primary Examiner—Margaret Medley
Attorney, Agent, or Firm—Fish & Richardson

[57] ABSTRACT

Injection of additive such as ammonia or calcium compounds along with a small amount of hydrocarbon, preferably methane or natural gas, in a relatively high temperature region of the effluent stream for effectively reducing pollutants such as $NO_x$ and $SO_x$. Preferably, injection is achieved by atomization of a liquid-form additive or additive solution with a small amount of gaseous hydrocarbon.

17 Claims, 9 Drawing Sheets

REDUCTION OF COMBUSTION EFFLUENT POLLUTANTS

FIELD OF THE INVENTION

This invention relates to reduction of pollutant species in the effluent of combustion systems by injection of additives to the effluent.

BACKGROUND OF THE INVENTION

Concern over the emission of acid rain precursors, $NO_x$ and $SO_x$, from stationary combustion processes is likely to lead to increasingly tight regulations. In certain areas, no single method of in-furnace or post-combustion reduction of these pollutants suffices. For reducing $NO_x$ emission, methods of post-combustion flue gas treatment include the injection of ammonia in the presence of a sufficient amount of $O_2$ to selectively reduce $NO_x$ from the combustion effluent. Reduction of $SO_2$ may be affected by injection of calcium compounds.

SUMMARY OF THE INVENTION

An object of the invention is to reduce the emission of combustion process-produced pollutants, such as bound nitrogen species, e.g. $NO_x$, and sulfuric acid precursors, e.g., $SO_x$, by the injection of additives into the effluent. In the case of bound nitrogen species, the additives promote reaction pathways that lead to the harmless species, $N_2$. In the case of $SO_x$, the additives react with $SO_x$ and the sulfur is retained in a relatively harmless form. It is also an object to make these injections in such a way that the pollutants may be reduced in the dynamic environment of rapidly changing temperatures and chemical species concentrations in the turbulent flow of practical combustion systems, such as waste incinerators and power generation facilities, without the additives themselves contributing substantial pollutants to the flow.

It has been discovered that these objects can be achieved by injection of additives along with certain small amounts of hydrocarbons, preferably methane or natural gas, in a relatively high temperature region of the combustion product stream, preferably by atomization of a liquid-form additive or additive solution with a small amount of gaseous hydrocarbon. Injection at relatively high temperatures allows for high reaction rates of the additive with pollutant precursors over a relatively wide temperature range which is an especially important consideration for effluent streams which are cooling rapidly such as those found in commercial power generation combustors and waste incinerators. The use of a hydrocarbon at low concentrations also enhances the kinetics of the reactions, further enhancing the efficiency of the reactions in a rapidly cooling environment, without substantial production of detrimental byproducts such as CO, often associated with hydrocarbon injections. Injection is carried out in a single stage, such that the additive and hydrocarbon are present in the same physical region of the effluent, exposed simultaneously to substantially the same temperature regime. For example, the use of an injection scheme in which the additive is atomized with the hydrocarbon enhances the efficiency of the reduction by promoting intimate mixing of the hydrocarbon and the additive, without a non-reactant atomizing medium such as high pressure steam or air, which both dilute the reactants and locally cool the effluent, thereby reducing the temperature, inhibiting reaction kinetics. Employing the invention, over 90% reduction in the amount of $NO_x$ may be achieved.

The invention is effective in reducing not only $NO_x$, but other species containing bound nitrogen, i.e., the total bound nitrogen (TBN) which are further potential sources for the formation of $NO_x$ by oxidation. As discussed herein TBN includes, the sum of species such as HCN, HNCO, NCO, $NH_3$, $NH_2$, NH, N, NO, $N_2O$, $N_2H_2$, $N_2H$, nitrogenous combustion products, and unburned nitrogenous fuel contaminants. Their conversion to molecular nitrogen may be achieved by atomization of an ammonia-producing compound with hydrocarbon.

In a first aspect, the invention features a method for the reduction of TBN in the $NO_x$ containing combustion products of a combustion process. The method includes injecting in the fuel lean region of the combustion products an ammonia-producing additive and a hydrocarbon. The concentration ratio (or molar ratio on a volume to volume basis (ppm/ppm)) of the hydrocarbon to the additive is between 0.2 and 0.01 and the injection occurs in a temperature range above about 1700° F.

In various embodiments, the hydrocarbon is an unsubstituted, saturated hydrocarbon, such as methane or natural gas. The ratio of hydrocarbon to additive is about 0.15 and 0.01, preferably, about 0.1 and 0.03. The temperature is about 1750°–2100° F., more preferably, 1800°–1950° F. The amount of additive is selected such that the molar ratio of additive to $NO_x$ in effluent is about 2.0 or less, preferably, about 1.0 to 1.5. The effluent has a temperature decay on the order of about 500° F./sec or more. The injection is achieved by atomizing additive with hydrocarbon. The additive is a liquid and the hydrocarbon is a gaseous hydrocarbon. The additive is ammonia, urea, cyanuric acid, or ammonium hydroxide and solutions and mixtures thereof.

In another aspect, the invention features a method for modification of the effluent of a combustion process by providing in a fuel lean region of the effluent a mixture of a gaseous hydrocarbon and an additive effective in reducing a desired combustion product from the effluent by atomization of the additive with gaseous hydrocarbon to create a locally hydrocarbon rich region about the additive.

In various embodiments, the gaseous hydrocarbon is natural gas or methane. The additive is a liquid-form, ammonia-producing additive, reactive with effluent to reduce total bound nitrogen emission. The ammonia-producing compound is selected from ammonia, urea, cyanuric acid, ammonium hydroxide and aqueous solutions and mixtures thereof. The hydrocarbon is about 5 to 15% by weight of the mixture. The mixture is injected into effluent where effluent has a temperature in the range from about 1300° to about 2100° F.

For reduction of $SO_x$ emission, the additive is a calcium containing compound. The calcium containing compound is selected from the group consisting of calcium acetate, lime, hydrated lime, limestone and mixtures and solutions thereof. The hydrocarbon is natural gas. The mixture is injected into the effluent where the effluent has a temperature in the range of about 2800° F. to 1700° F., e.g., greater than about 2300° F. The atomization is carried out with a high momentum atomizer. Hydrogen peroxide or $CH_4$ is injected into effluent downstream of the additive injection.

In another aspect, the invention features a method for reduction of $SO_x$ pollutants in the effluent of a combustion process by injecting in a fuel lean region of the effluent a calcium containing compound for reaction with $SO_x$ in the effluent, in combination with a hydrocarbon in sufficient amounts to form a locally fuel-rich region about compound, the injection occurring in a temperature range of about 1700° F. to 2800° F.

In various embodiments, the effluent remains in an overall fuel lean condition after injection. The additive is selected from calcium acetate, lime, hydrated lime, limestone and mixtures and solutions thereof. The temperature is greater than about 2300° F. The hydrocarbon is natural gas.

In another aspect, the invention features a method for the reduction of pollutants in the effluent of a combustion process by injecting in a fuel lean region of the effluent a calcium containing compound for reaction with $SO_x$ in the effluent, in combination with a hydrocarbon in sufficient amounts to form a locally fuel-rich region about compound, while maintaining the effluent in an overall fuel lean condition, the injection occurring in a temperature range of about 1700° F. to 2300° F. and injecting in the fuel-ratio lean region of effluent an ammonia producing additive and a hydrocarbon consisting of methane or natural gas, the molar ratio of additive to $NO_x$ being between about 1.0 and 1.5, the concentration ratio of hydrocarbon to additive being between about 0.15 and 0.01, and the injection occurring in a temperature range of about 1750° to 2100° F.

In another aspect, the invention features a method for the reduction of $NO_x$ and $SO_x$ pollutants in the effluent of a combustion process, comprising injecting in a fuel lean region of effluent calcium acetate in combination with a hydrocarbon in a temperature range of about 1700° or above.

Other embodiments and features follow.

DESCRIPTION OF THE PREFERRED EMBODIMENT

We first briefly describe the drawings.

DRAWINGS

STRUCTURE AND OPERATION

Figure 1:
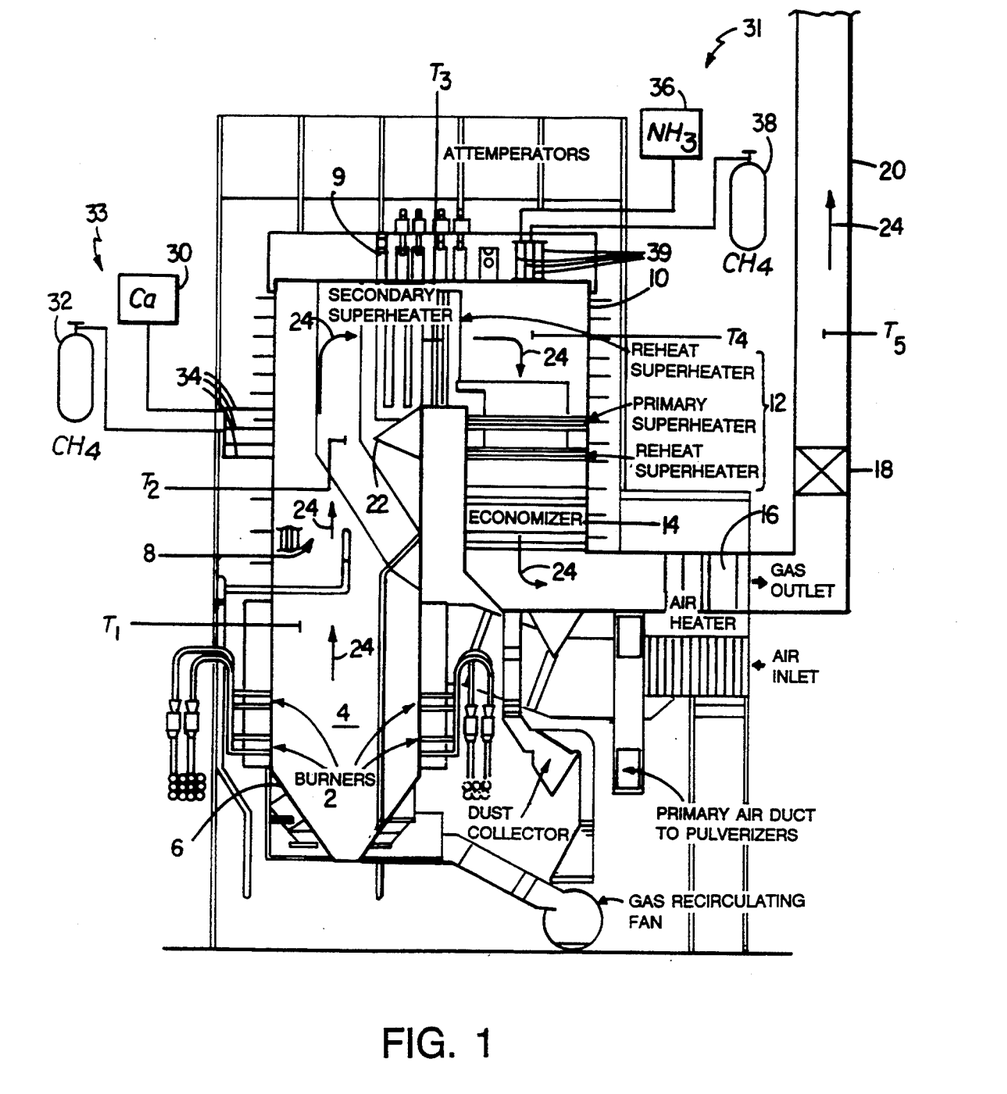
FIG. 1 is a schematic of a combustion system, illustrating injection of additives, according to the invention.

Referring to FIG. 1, a commercial, coal burning boiler used for steam raising for power generation or for industrial process steam is shown to include a combustion chamber 6 with an assembly of burners 2. The region of the combustion chamber 6 immediately adjacent to the burners 2 is called the burner zone 4. The furnace walls consist of steam generating tubes 8 which absorb heat by radiation mainly from the flame to produce saturated steam. At the exit from the combustion chamber, the combustion products exit the nose 22, enter a duct 10, including superheaters 9 and tube banks of convective heat exchangers. The superheaters 12 include convective steam superheaters and reheaters for the preparation of the steam for use in steam turbine (not shown). Economizers 14 are for preheating the boiler feed-water and air preheaters 16 for preheating the combustion air. Past the preheater 16 the flue gas enters the gas cleaning equipment 18, e.g., a scrubber and gas solid separator. The cleaned gas is then exhausted to the environment through the stack 20. In a typical commercial-sized system, e.g., 300 MWe, the duct is 30–40 feet wide, and effluent flow rates are in the range of $6 \times 10^5$ SCFM. The boiler is typically fired hydrocarbon fuels such as oil, natural gas, or coal as illustrated. It will also be understood the invention is applicable to other fuel utilization or combustion systems such as waste incinerators.

In the region 4 where combustion is initiated, a mixture of fuel and a small stoichiometric excess of oxygen are present (fuel lean). At the exit of the furnace region 6, near the nose 22, combustion is substantially complete and the effluent from the combustion system is also typically fuel lean, (i.e., the oxygen present is in excess of the stoichiometric amount needed to fully oxidize the sum of hydrocarbons present in the effluent) e.g. about 0.5 to 7% stoichiometric excess oxygen is present. As the combustion products pass through the boiler 14 as indicated by arrows 24, the temperature falls. For example, at the position indicated as $T_1$, the combustion products have a temperature of about 2700° F., cooling to, for example, a temperature of about 2300° F. at position $T_2$ near the furnace region exit, The products leaving the furnace region as effluent cool to about 2000° F. at position $T_3$, near the superheaters and to about 1700° F. at a position $T_4$, before the economizers 8, and finally, to about 300° F. at position $T_5$, downstream of the scrubber 18. In typical combustor systems, the temperature of the effluent may be cooling rapidly, e.g., in the range of hundreds of degrees per second, e.g., 500° F./sec or above.

An atomization stage 31, is provided for injection of an ammonia producing compound to reduce bound nitrogen species, e.g., $NO_x$, and an atomization stage 33 is provided for injection of a calcium sorbent to reduce $SO_x$ species. In stage 31, ammonia-producing material such as liquid ammonia, is provided from a supply 36, along with a small amount of natural gas from a supply 38 to a series of atomizer nozzles 39, such that the natural gas atomizes the ammonia-producing compound in a high momentum spray. The high momentum is important for the effective admixing of the additive to the combustion products by effecting sufficient penetration of the spray into the duct. In stage 33 a calcium sorbent, such as calcium acetate, for elimination of $SO_x$ is provided from a supply 30, along with natural gas from a supply 32 to a series atomizer nozzles 34, such that the natural gas atomizes the sorbent to form a high momentum spray. The nozzles are typically operated to produce droplet sizes in the range of about 20–100 μm. Larger droplet sizes are employed for higher effluent flow rates. The number, type and size of the nozzles is selected based on the desired penetration and entrainment of the flue gas into the effluent stream. The nozzles are provided with sufficient pressure to extend the spray across the duct width, and operating conditions selected, based on duct width and effluent flow rate. High momentum pressure atomization nozzles 34, 38 need not extend into the duct, but rather are flush with the duct wall, to eliminate slagging of the nozzles by exposure to effluent solids such as ash.

A particular feature of the invention is that additives effective in reducing desired combustion products are injected into the fuel lean region of the effluent by atomization of the additive with a small amount of hydrocarbon, to create a locally fuel-rich region about the additive while the effluent remains, overall, fuel lean. In particular embodiments, the additive is a liquid-form material, either a pure additive or an additive solution or slurry, and the atomizing hydrocarbon is a gas. The additive may also be particulate in nature and be entrained in the air flow. The atomization arrangement allows for rapid mixing of the additive with the hydrocarbon in the effluent stream and allows the gaseous hydrocarbon to promote evaporation of liquid additives. The injection can be made without substantial dilution of the additive and hydrocarbon reactants or unnecessary cooling of the effluent. Preferably, the atomizing medium is a gas, i.e., it is a compressible medium, used to impart momentum to the additive, preferably a liquid, as the additive mixes with the liquid and is accelerated during passage through a nozzle while expanding to atmospheric pressure. Most preferably, the atomizing medium is an unsubstituted (containing only hydrogen and carbon) and saturated (containing only single bonds) hydrocarbon that is in the gas phase at atmospheric temperature and pressure. Most preferably, the medium is natural gas. Natural gas is typically available from central supply sources at high pressure, (e.g., p∼40 psi) which permits high atomization quality to be obtained even using relatively small amounts of natural gas (e.g., less than 20% by weight of the total mixture injected).

Figure 2:
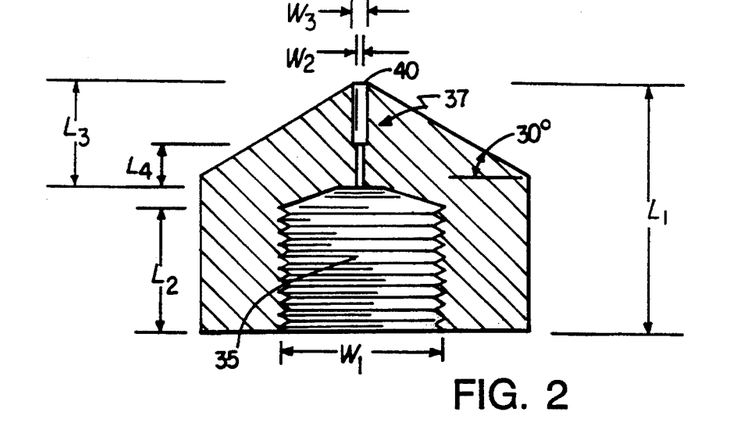
FIG. 2 is a schematic of a nozzle atomizer for injection according to the invention.

Referring now to FIG. 2, a divergent nozzle for atomization of additives with hydrocarbons includes a relatively wide mixing stage 35, in which, e.g. natural gas, and the additive are mixed and pressurized and a divergent stage 37, terminating in an exit orifice 40, in which gas pressure is converted to jet momentum. A nozzle used in experiments discussed herein below may be fastened to a tubing member by threads has an overall length $L_1$, about 0.990 inch. The mixing region 35 has a width of about $W_1$, about 1.180 inch and length $L_2$ about 0.446 inch. The divergent region 37 has an overall length $L_3$ of about 0.323 inch, a first stage of length $L_4$, about 0.123 inch, and a width of $W_2$, about 0.031 inch and a second stage width of $W_3$, about 0.052 inch. For typical applications nozzle pressure at the inlet is about 40 psi. The nozzle is generally constructed for a desired additive to hydrocarbon ratio. Other nozzles, such as Laval nozzles may also be used. Further discussion of Laval nozzles, along with optimal interrelationship of the dimensions and performance is discussed in Perry et al., *Chemical Engineering Handbook*, McGraw-Hill, 1973, page 529. A feature of the Laval nozzle is that substantially all of the pressure energy is convected to kinetic energy of the flow. The dimensions and operating conditions of the above nozzle are useful for experimental sized-applications. Nozzle size may be scaled with the combustor.

Figure 3:
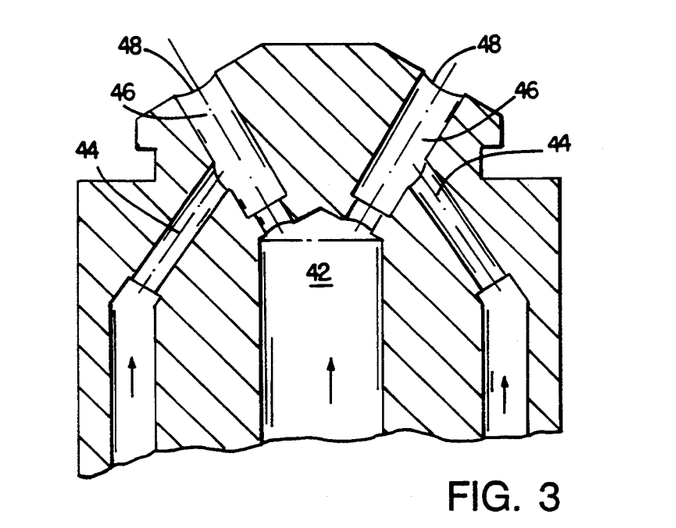
FIGS. 3 and 3a are schematic, cross-sectional and end on views, respectively, of a "y"-jet atomizer, for injection according to the invention.
Figure 3A:
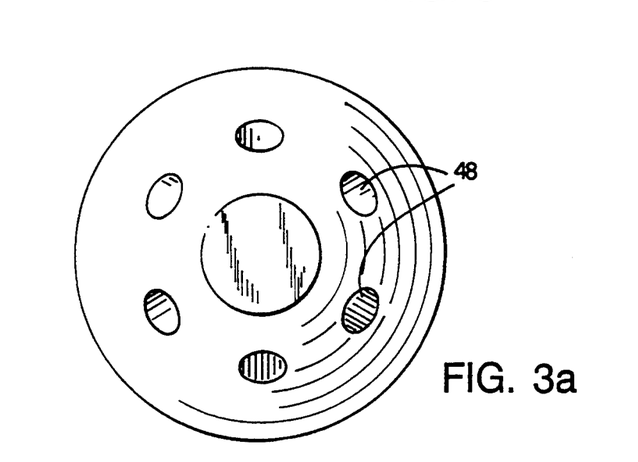

Referring to FIGS. 3 and 3a, a nozzle of the Y-jet design is illustrated in cross-section and end-on view. Additive passes through a central lumen 42 while atomizing medium is introduced through multiple outer lumens 44 located about the central lumen. The central lumen and outer lumens intersect in a "Y" configuration to enable mixing of the atomizing medium and the additive in the outlet tube 46 so that a spray is generated at the exit opening 48. Typically, six or eight exit openings are provided.

It will be understood that other nozzle designs may be used, provided sufficiently high momentum is induced to the injected species, and the nozzle may be operated for atomization using the amount of atomizing medium and additive, as described herein.

TBN Reduction

The ammonia-producing compound may be, e.g., liquid ammonia, urea, ammonium hydroxide, cyanuric acid and aqueous solutions and mixtures thereof. The additive may also be pre-mixed with an agent such as a hydrocarbon or other reactive species. Atomizing the ammonia-producing compound with a hydrocarbon atomizing medium produces a locally fuel rich environment in which the ammonia vaporizes. The conditions for the $NO_x$-$NH_i$ reactions proceed toward the conversion of $NO_x$ to $N_2$. The hydrocarbon reacts to produce radicals that in turn react with ammonia to produce species such as $NH_2$ and NH, which in turn react with the $NO_x$ in the effluent to produce amino species which are reduced to form mainly $N_2$. In addition, in the locally fuel-rich region created by the atomization, the $NO_x$ reacts with hydrocarbon fragments such as $CH_i$ radicals, e.g. $NO+CH\rightarrow HCN+O$, or $NO+CH_2\rightarrow HCN+OH$. The cyanides then form amines via intermediates such as HNCO and NCO, with the eventual formation of molecular nitrogen, $N_2$. The presence of the proper radical pool generated from the breakdown of the hydrocarbon atomizing medium, preferably natural gas, also results in the destruction of residual $NH_3$ by the reaction pathways that enable reaction of the amino species with each other to form $N_2$, thus reducing $NH_3$ emission and reaction byproducts (e.g. $N_2O$, HCN, HNCO), so called "slippage".

Injection of the ammonia producing additive by atomization with the hydrocarbon takes place at a position along the effluent stream where the effluent temperature is in the range above 1700° F., preferably, between 1750° to 1950° F., most preferably between about 1800°–1900° F. The amount of ammonia producing additive to be injected is based on the amount of $NO_x$ in the effluent stream. Typically, the mole ratio of the additive to $NO_x$ is about 2.0 or less, preferably between about 1.0 to 1.5. It will be understood that mole ratios of greater than 2.0 can be used, without excessively high ammonia slippage. Typically, the hydrocarbon makes up about 0.5 to 15%, most preferably about 5%, by weight of the injected gas mixture, depending, e.g., on the form of the additive (e.g., pure ammonia or aqueous solution). The amount of hydrocarbon is selected based on the amount of ammonia producing species to be injected. Typically, the concentration ratio of hydrocarbon to additive is about 0.2 or less, preferably about 0.1 or less, most preferably about 0.05 to 0.01. Typically, TBN reduction is greater than 70%, more typically greater than 80% or 90% (concentration percentage based on $NO_x$ concentration at combustion chamber exit.)

The high efficiency of TBN reduction as described herein is attributed to proper molar ratios of additive to $NO_x$ and hydrocarbon to additive that enhance the kinetics of the $NO_x$ reducing reactions in effluent streams with rapidly changing temperature. Atomization of the additive with the hydrocarbon also enhances efficiency by providing efficient mixing, while minimizing cooling and dilution effects. The following computer-generated chemical kinetic simulations in FIGS. 4-11 illustrate the principle. The data were computed by the Chemkin kinetic program, available from U.S. DOE-Sandia National Laboratory.

Figure 4:
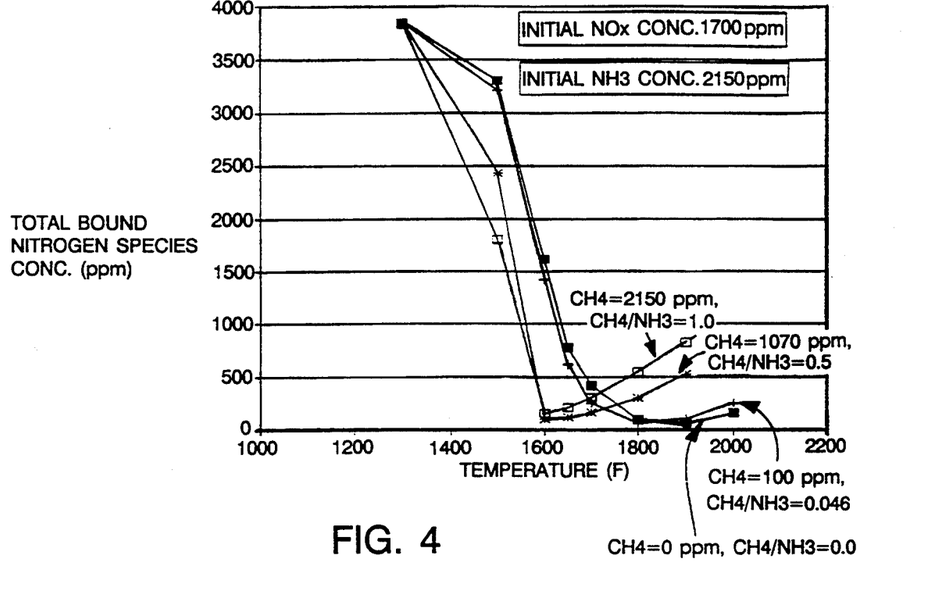
FIG. 4 is a calculated plot of TBN as a function of temperature for various ratios of hydrocarbon to ammonia additive.
Figure 5:
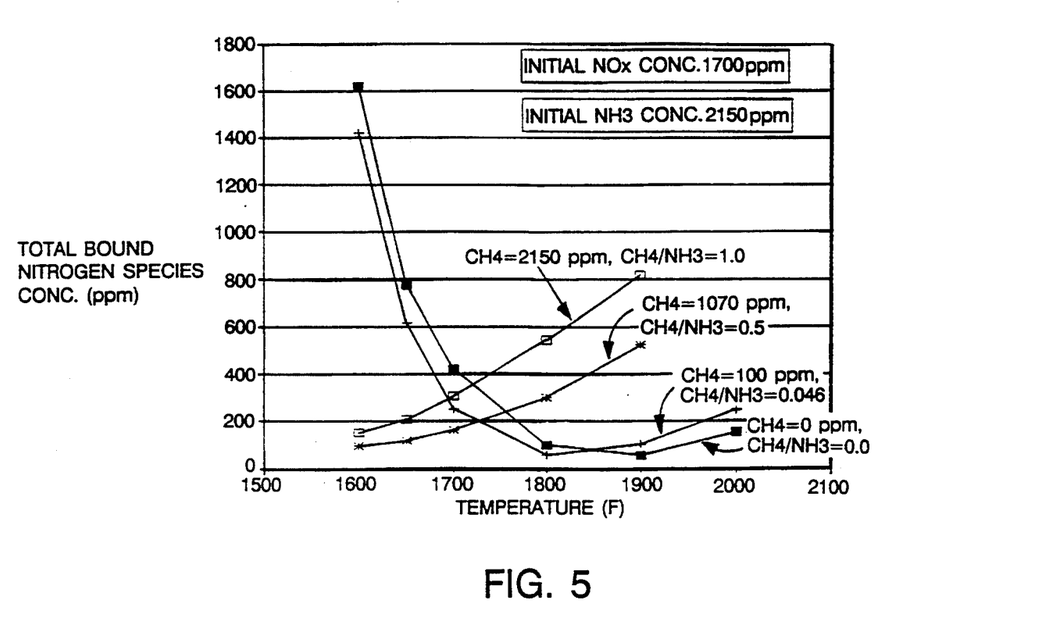
FIG. 5 is an expanded view of a portion of the plot in FIG. 4.
Figure 6:
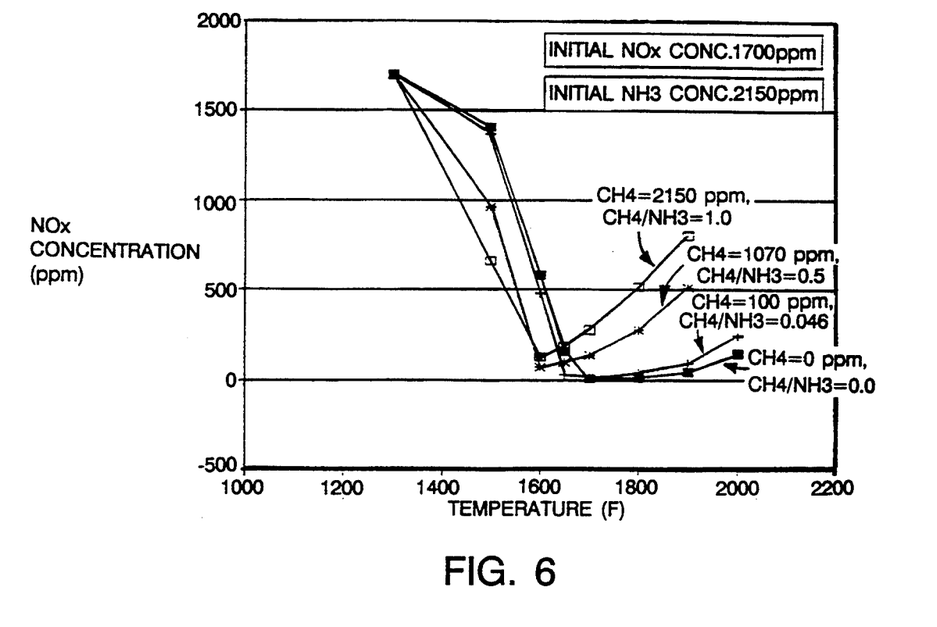
FIG. 6 is a calculated plot of $NO_x$ concentration as a function of temperature.
Figure 7:
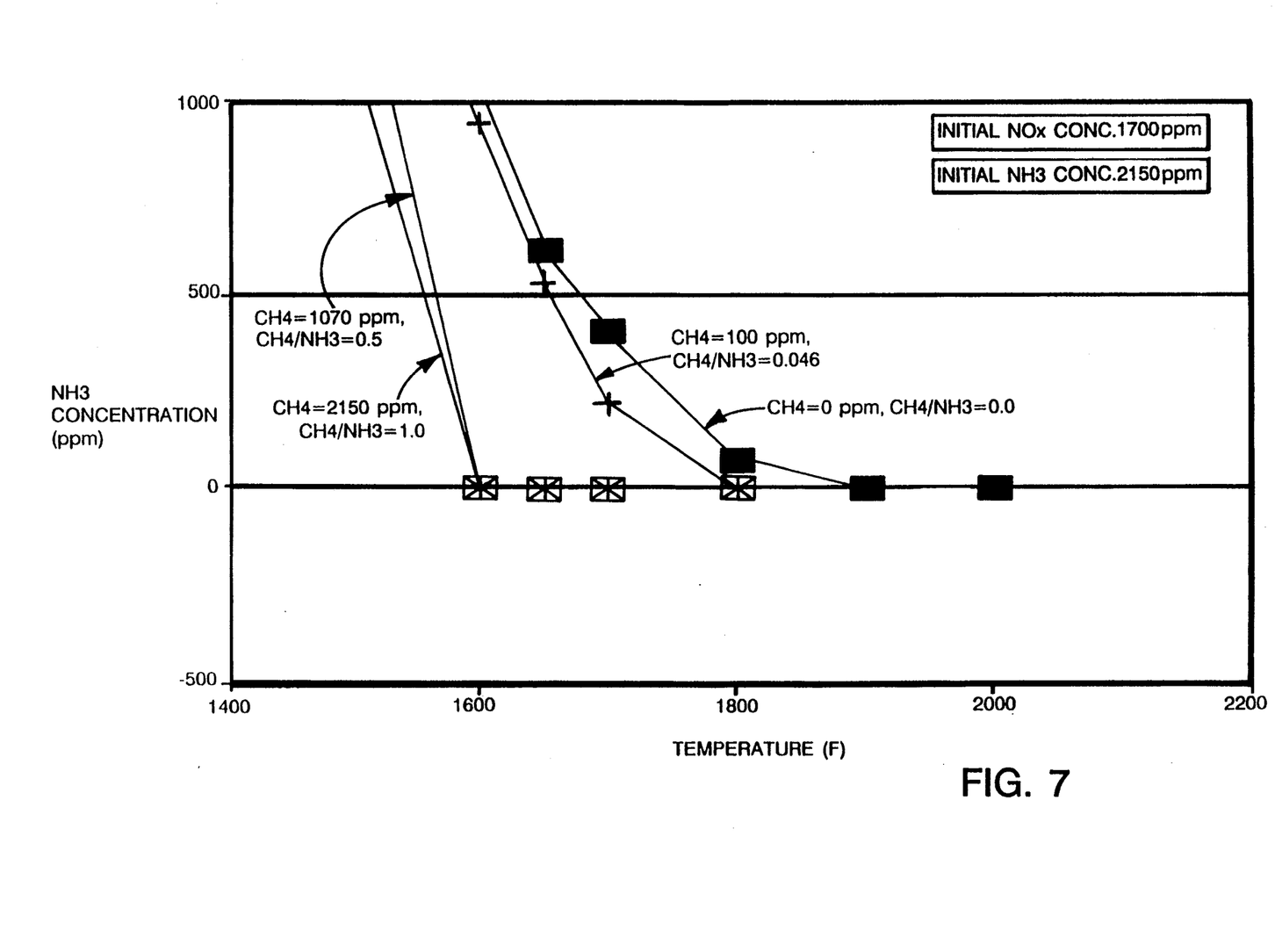
FIG. 7 is a calculated plot of $NH_3$ concentration as a function of temperature.
Figure 13:
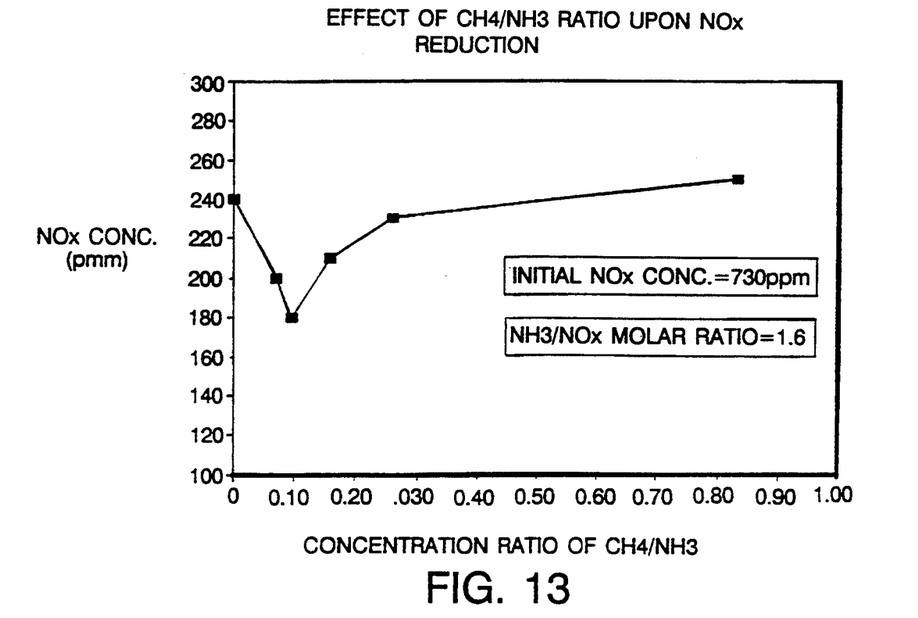
FIG. 13 is a graph illustrating experimental reduction of total bound nitrogen and $NO_x$ according to the invention.

Referring to FIGS. 4 and 5, plots of TBN concentration versus temperature are illustrated for various ratios of hydrocarbon to methane additive. Small amounts of methane, e.g., methane/ammonia ratio of about 0.046, can be used to effect low TBN at temperatures above about 1700° F., whereas high concentrations in this temperature range do not as effectively reduce TBN. In addition, the temperature range in which small TBN levels can be kept below 500 ppm is wide, approximately 300° F. or more (1700°-2000° F.). Further, compared to the use of high concentrations (methane/ammonia=1.0, 0.5), for low hydrocarbon to additive ratios, the steepness of the TBN increase at temperatures below the minimum is relatively mild. This result allows more efficient TBN reductions in effluent streams with rapidly falling temperature and under conditions of part load (turn down) when the effluent temperature is lower than at full load at a position in the duct. Referring to FIGS. 6 and 7, similar trends are illustrated, respectively, for plots of $NO_x$ and $NH_3$ as a function of temperature. (Experimental data, shown in FIG. 13, illustrates the favorable effect of small amounts of hydrocarbon injection.)

Figure 8:
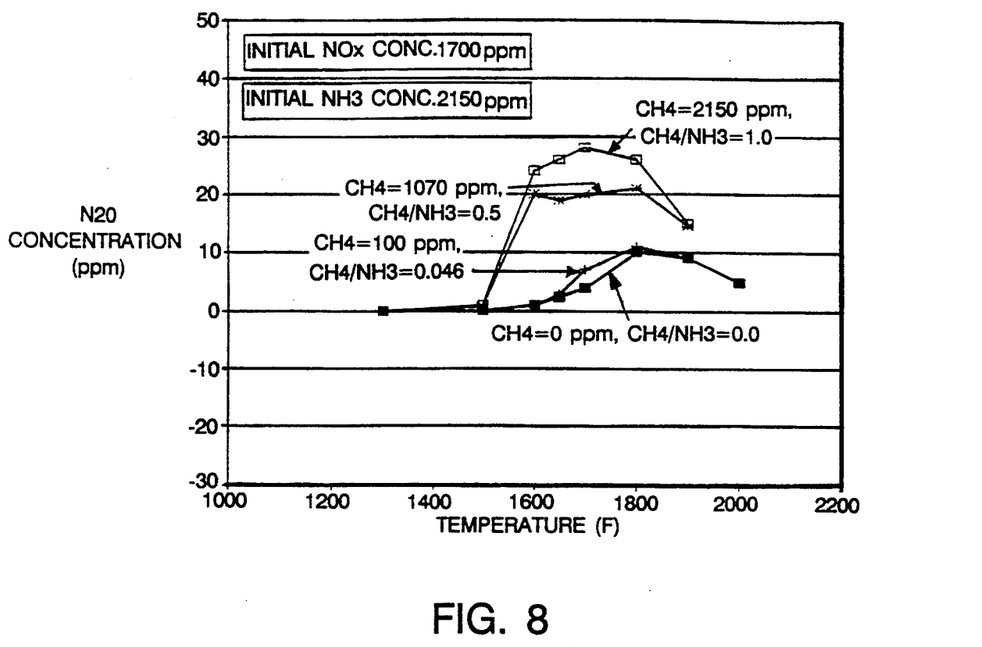
FIG. 8 is a calculated plot of $N_2O$ concentration as a function of temperature.

Referring to FIG. 8, a plot of $N_2O$ concentration as a function of temperature, as in the above figures as shown. The plot illustrates that for high methane/ammonia ratios, the amount of $N_2O$ is nearly double that for low ratios of the invention. Low $N_2O$ production is of importance for the reduction of the depletion of stratospheric ozone and the greenhouse effect. In sum, the above Figures illustrate that a small amount of methane in combination with ammonia is effective in maintaining low TBN (FIGS. 4 and 5) while at the same time enabling low ammonia slip (FIG. 7) without detrimental $N_2O$ (FIG. 8) and $NO_x$ emission (FIG. 6).

Figure 9:
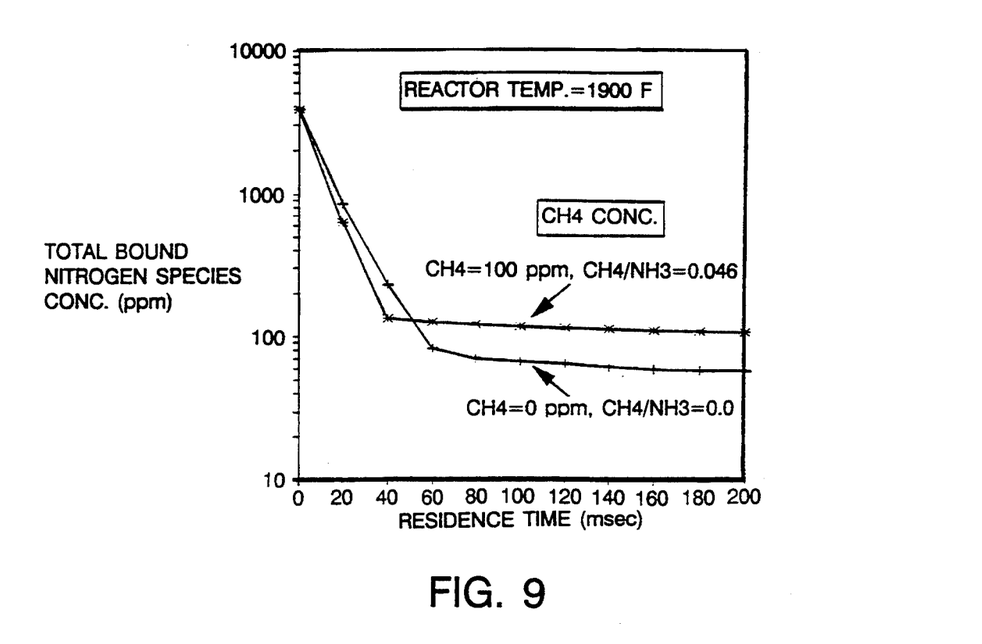
FIG. 9 is a calculated plot of TBN as a function of residence time at 1900° F. injection temperature.
Figure 10:
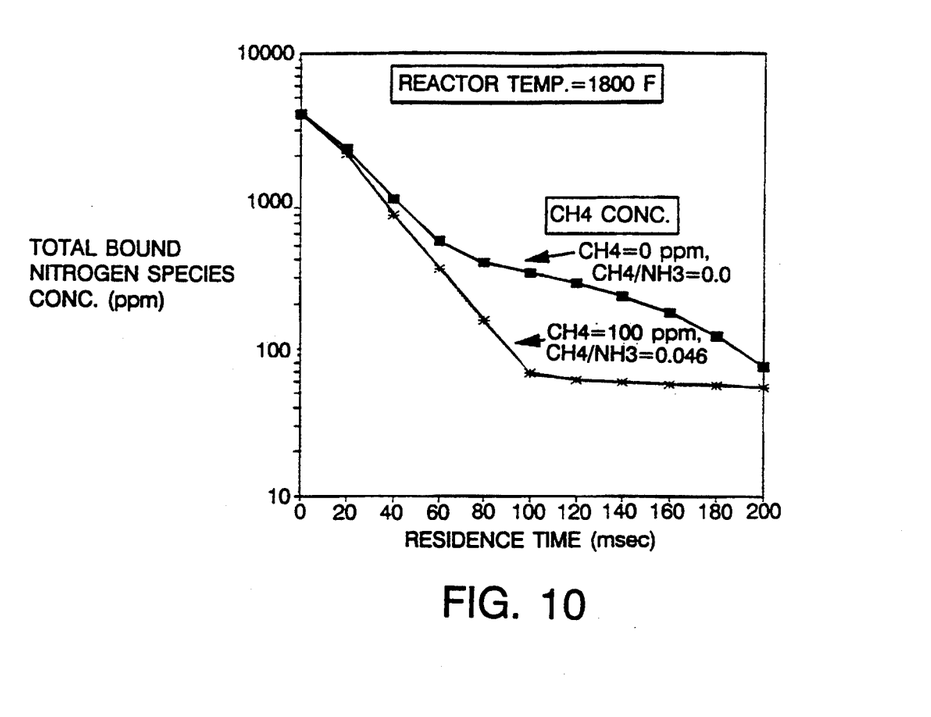
FIG. 10 is a plot similar to FIG. 10, at 1800° F. injection temperature.

Referring now to FIG. 9, the TBN concentration as a function of residence time is plotted for an injection of additive with ratios of methane/ammonia=0.046 and 0.0 (pure ammonia) at a temperature of 1900° F. A small amount of hydrocarbon, produces a substantial minimum after about 40 milliseconds (msec), compared to results without methane which took over 50 milliseconds to reach the same TBN reduction. Thus, a small amount of hydrocarbon with ammonia additive, as described, increases the kinetic rate of TBN reducing reactions. A similar plot is shown in FIG. 10, with injections at 1800° F. In this case, near the most preferred temperature range, the TBN reaches a minimum in about 100 msec, whereas injections without hydrocarbon do not produce similar TBN reduction in over 200 msec.

Figure 11:
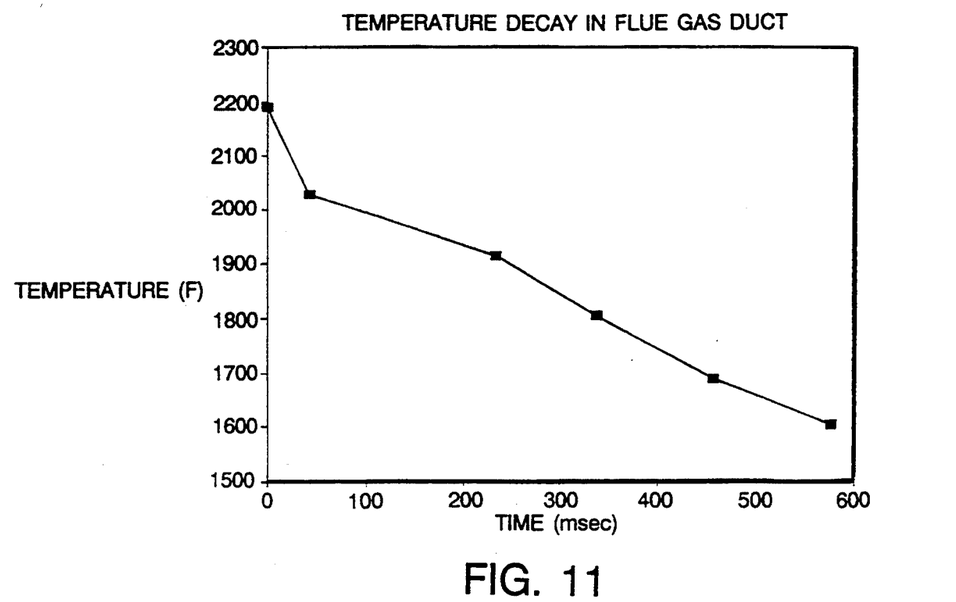
FIG. 11 is a plot of temperature decay measured in a research combustor.

Referring now to FIG. 11, the temperature decay in an experimental effluent stream described further in Example 1, is illustrated. The decay is approximately 1022° F./sec. In systems such as waste incinerators and power-generating combustors, temperature decay is typically in the range of about 500° F./sec. The highly turbulent flow may be accomplished by atomization with hydrocarbons.

$SO_x$ Reduction

For reduction of $SO_x$ species in the effluent, may also create pockets or zones of varying temperature injection of a sorbent such as calcium containing compounds Calcium compounds are preferably supplied in water soluble form or slurry and include, for example, lime, hydrated lime, calcium carbonate or calcium acetate but may also be particulate in nature, e.g., lime particles. The CaO crystallites formed by nucleation of e.g., calcium acetate following atomization are finely dispersed, providing a larger surface area to mass ratio, than typically achievable with hydrated lime or calcium carbonate injection. Increased sorbent utilization results.

The calcium compounds react with $SO_x$ in the effluent to form calcium sulfite ($CaSO_3$), which further oxidizes to form calcium sulfate ($CaSO_4$) as temperature is lowered. If the sorbent is in liquid form, it is introduced into the effluent by atomization, preferably with natural gas. However, if the sorbent is in a solid form, the hydrocarbon atomizing medium is used to carry the particles into the duct. The fuel-air ratio is locally fuel rich by the addition of the natural gas (and the acetate in the sorbent in the case of calcium acetate) which favors the $NO_x$reducing reactions. In the case of calcium acetate, reduction in $NO_x$ may be achieved in addition to $SO_x$.

Figure 12:
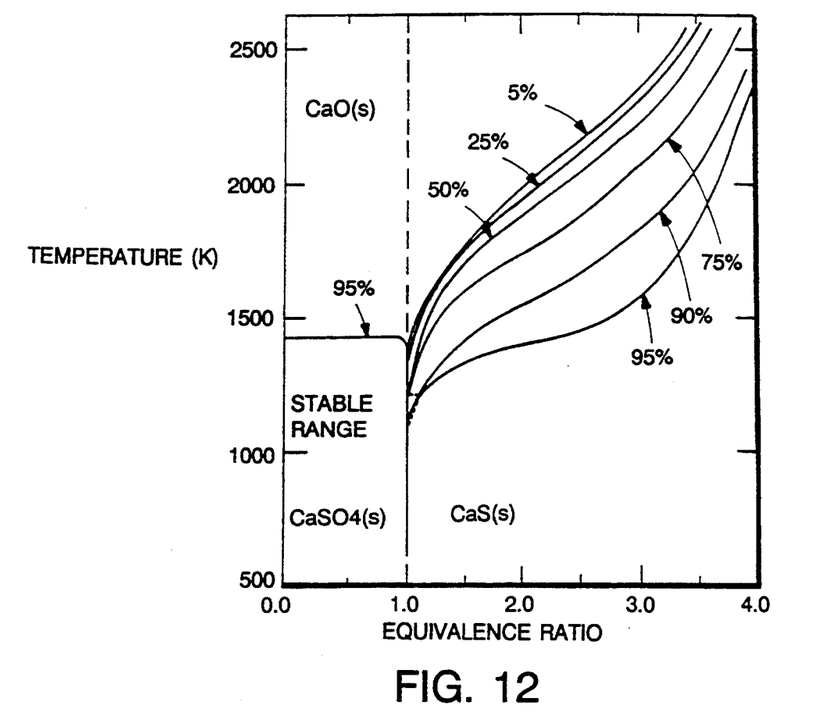
FIG. 12 is a thermodynamic equilibrium phase diagram of certain calcium species.

Referring to FIG. 12, a known thermodynamic equilibrium phase diagram of CaO, $CaSO_4$ and CaS is illustrated. The percentage lines in the diagram refer to the sulfur capture efficiency as a function of temperature and fuel equivalence ratio. (Stability relationships are discussed further in Torrez-Ordonez, R., *Department of Chemical Engineering*, Ph.D. Thesis, Massachusetts Institute of Technology, Cambridge, Mass., 1987.) As the diagram indicates, calcium sulfate, $CaSO_4$, the desired product of $SO_x$ and the sorbent is stable at temperatures below about 2300° F. under fuel lean conditions Above 2300° F. calcium sulfate decomposes to calcium oxide (CaO) and $SO_x$ is released to the effluent. However, under fuel-rich conditions, CaS is stable at higher temperature. An aspect of the invention is that atomization with hydrocarbon may be made in a temperature range that is low enough for the products of sulfation ($CaSO_3$ or $CaSO_4$) to remain stable. A particular advantage of atomization of calcium-producing compounds with hydrocarbons is the increase in the temperature range, above the stable range for calcium sulfation products in fuel lean environments. By atomization with a hydrocarbon, a locally hydrocarbon rich environment is provided about the calcium particles which inhibits decomposition of CaS, thus retaining the captured sulfur. After equilibrium to the fuel-lean condition downstream of the injection, the temperature has cooled sufficiently to maintain stability. Injections may therefore be made at temperatures of up to about 2800° F. High temperature injection of the calcium sorbent in this manner allows injection further upstream and hence greater residence time and more efficient $SO_x$ reduction. A preferred injection temperature is just above the decomposition temperature of calcium sulfate, e.g., about 2300° F. However, it will be understood that injection may be made at lower temperatures, e.g., down to about 1600° F. At the lower temperature range, the calcium sorbent may also be co-injected with an $NO_x$ reducing additive by atomization with a hydrocarbon.

In particular embodiments, the hydrocarbon employed for atomization is natural gas and may be from about 5% to 95% by weight of the mixture of calcium compound and hydrocarbon. At the higher ratios of methane injection, an overall fuel-rich condition might exist, thus creating reburn conditions, which are highly conducive to the reduction of $NO_x$ to $N_2$. In the process sulfur capture would occur through the combined injection of, e.g., calcium acetate with hydrocarbon gas. The amount of the calcium compound injected is selected based on the Ca/S mole ratio to be maintained in the duct. Typically, the Ca/S mole ratio is maintained in the range of about 1 to 6, more typically about 1 to 4.

The invention is further illustrated by the following examples.

EXAMPLE 1

An experimental study of $NO_x$ reduction by atomization of $NH_3$ using a hydrocarbon was carried out at the MIT combustion research facility (MIT-CRF). The Combustion Research Facility, is designed to facilitate detailed experimental investigations of industrial-type turbulent diffusion flames; it consists of a 1.2 m × 1.2 m cross-section 10 m long combustion tunnel equipped with a single burner having a 3 MW thermal input, multi-fuel firing capability. During experiments the combustion tunnel is normally comprised of 15 of 0.30 m wide, refractory-lined water-cooled sections. The velocity of effluent flow in the region of injection was about 6 m/sec. The system was operated at 0.65 MW for these experiments. The experimental burner is more fully described in Beer et al. in "Laboratory Scale Study of Coal-Derived Liquid Fuels" *EPRI Report* AP4038, 1985. Injections were made with a nozzle as described in FIG. 2.

In the study, $NH_3$ was atomized with natural gas into the flue gas duct at a temperature of about 2000° F. Referring to FIG. 13 and Table I below, $NO_x$ measurements made for several levels of $CH_4$ are given. In the Table, CO concentration is also provided.

TABLE I

Initial $NO_x$ Conc. = 730 ppm
$NH_3/NO_x$ Ratio = 1.6

| $CH_4$ Conc. (ppm) | $NO_x$ Conc. at exit of process | CO Conc. (ppm) |
| --- | --- | --- |
| 0 | 240 | 28 |
| 82 | 200 | 48 |
| 112 | 180 | 62 |
| 186 | 210 | 67 |
| 298 | 230 | 77 |
| 969 | 250 | 87 |

In this example, for a $NO_x$ concentration of 730 ppm, the optimum ratios of $CH_4/NH_3$ for conversion to $N_2$ is in the range of about 0.03–0.2. The $NO_x$ concentration decreases initially then increases with increasing amount of hydrocarbon. In this example, the maximum $NO_x$ reduction, at minimum, was about 75% of the original $NO_x$ level. The level of CO was not excessive.

EXAMPLE 2

Figure 14:
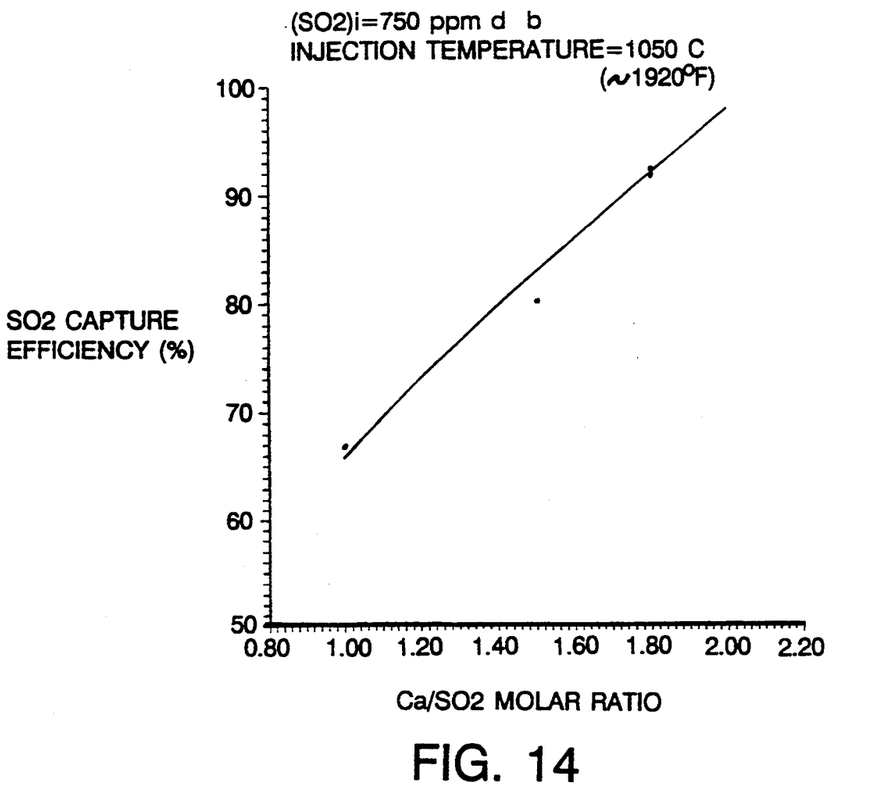
FIG. 14 is a graph illustrating experimental reduction of $SO_x$ according to the invention.

Experiments carried out at the MIT Combustion Research Facility, under conditions similar to Example 1 showed that by atomizing calcium sorbent with hydrocarbon a sulfur capture close to 100% can be obtained. FIG. 14 illustrates that at a Ca/S ratio of about 2.0, the sulfur in the gas phase was completely removed. At lower ratios of Ca/S the sulfur capture efficiency dropped, e.g., to reach a level of 66% at a ratio of 0.9. Injection was in the fuel lean zone below 2200° F. for the products of sulfation ($CaSO_3$ or $CaSO_4$) to remain stable. It was also observed that for an initial $NO_x$ concentration of 540 ppm $NO_x$ was reduced to 250 ppm with the injection of calcium acetate, with 2500 ppm of methane and a 2:1 molar ratio of calcium to sulfur. The initial $SO_2$ concentration was around 600 ppm. The effluent was overall fuel lean under these conditions. Injections were made with a nozzle as discussed in FIG. 2.

Other Embodiments

Injection of the $NO_x$ reducing additive or the $SO_x$ capturing additive can be made at several points along the furnace or incinerator. This method can ensure that the temperature at which the injection occurs always falls within the previously specified range as operating conditions may change. Some systems may only require one of the injection stages illustrated in FIG. 1, e.g., for injection of ammonia-producing compounds. In some embodiments it may be advantageous to inject oxidant compounds such as hydrogen peroxide ($H_2O_2$) or $CH_4$ downstream of the injection of the hydrocarbon atomization to complete oxidation of the hydrocarbon. Since the fuel/air mixture ratio at the additive injection point is overall fuel-lean, the residual oxygen in and the temperature of the flue gas generally ensures the complete burn-out of the combustible species added. However, if the CO and hydrocarbon concentrations increase in the process, the injection of an oxidative species such as $H_2O_2$ would eliminate such a problem.

Other embodiments are within the following claims.

We claim:

1. A method for reducing the amount of $NO_x$ pollutants in the effluent of a combustion process, comprising:
   providing an atomizing medium in the form of a hydrocarbon gas at atomizing pressures that is substantially free of nonhydrocarbon diluents such as steam or air, said hydrocarbon gas selected from the group consisting of methane and natural gas,
   providing an additive effective to reduce said pollutant in said effluent, the efficiency of said additive in reducing said pollutant being enhanced by the presence of said hydrocarbon gas, said additive is ammonia or ammonia-producing compound and being selected from the group consisting of urea, cyanuric acid, ammonium hydroxide and aqueous solutions thereof and mixtures thereof,
   providing an atomizing nozzle, located to inject into the effluent at a selected temperature regime of about 1300° F. to 2100° F. in a fuel lean region of said effluent, downstream of the combustion, said atomizing nozzle constructed to receive said hydrocarbon gas atomizing medium, at said atomizing pressure, and said additive and atomizing said additive with said hydrocarbon gas atomizing medium to inject an atomized spray of a mixture of said hydrocarbon gas and said additive, to simultaneously mix said hydrocarbon and additive with effluent in a selected effluent temperature regime and efficiently remove said pollutants.

2. A method for reducing the amount of $SO_x$ pollutants in the effluent of a combustion process, comprising:

providing an atomizing medium in the form of a hydrocarbon gas at atomizing pressures that is substantially free of nonhydrocarbon diluents such as steam or air, said hydrocarbon gas selected from the group consisting of methane and natural gas, providing an additive effective to reduce said pollutant in said effluent, the efficiency of said additive in reducing said pollutant being enhanced by the presence of said hydrocarbon gas, said additive is a calcium containing compound selected from the group consisting of calcium acetate, lime, hydrated lime, limestone and solutions thereof and mixtures thereof, providing an atomizing nozzle, located to inject into the effluent at a selected temperature regime above 1700° F. to 2800° F. in a fuel lean region of said effluent, downstream of the combustion, said atomizing nozzle constructed to receive said hydrocarbon gas atomizing medium, at said atomizing pressure, and said additive and atomizing said additive with said hydrocarbon gas atomizing medium to inject an atomized spray of a mixture of said hydrocarbon gas and said additive, to simultaneously mix said hydrocarbon and additive with effluent in a selected effluent temperature regime and efficiently remove said pollutants.

3. The method of claim 1 or 2 wherein said atomization is carried out with a high jet momentum producing atomizer.

4. The method of claim 1 or 2 further comprising injecting hydrogen peroxide or $CH_4$ into said effluent downstream of said additive injection.

5. The method of claim 1 wherein the concentration ratio of said hydrocarbon to said additive is between about 0.2 and about 0.01, and said injection occurs in the effluent temperature regime of about 1700° F.

6. The method of claim 5 wherein said effluent has a temperature decay on the order of about at least 500° F./sec.

7. The method of claim 5 wherein said ratio of said hydrocarbon to said additive is between about 0.15 and 0.01.

8. The method of claim 7 wherein said ratio of said hydrocarbon to said additive is between about 0.1 and 0.03.

9. The method of claim 5 wherein said temperature is about 1750°–2100° F.

10. The method of claim 9 wherein said temperature is about 1800°–1950° F.

11. The method of claim 5 further comprising, selecting the amount of additive such that the molar ratio of the additive to the $NO_x$ in said effluent is up to about 2.0.

12. The method of claim 11 wherein said molar ratio of the additive to the $NO_x$ in said effluent is about 1.0 to 1.5.

13. The method of claim 1 further comprising the step of reducing the amount of $SO_x$ pollutant in the combustion process by:

providing an atomizing medium in the form of a hydrocarbon gas at atomizing pressures that is substantially free of nonhydrocarbon diluents such as steam or air, said hydrocarbon gas selected from the group consisting of methane and natural gas, providing an additive effective to reduce said pollutant in said effluent, the efficiency of said additive in reducing said pollutant being enhanced by the presence of said hydrocarbon gas, said additive being a calcium containing compound selected from the group consisting of calcium acetate, lime, hydrated lime, limestone and mixtures and solutions thereof, providing an atomizing nozzle, located to inject into the effluent at a selected temperature regime above 1700° F. to 2800° F. in a fuel lean region of said effluent, downstream of the combustion, said atomizing nozzle constructed to receive said hydrocarbon gas atomizing medium, at said atomizing pressure, and said additive and to inject an atomized spray of a mixture of said hydrocarbon gas and said additive, to simultaneously mix said hydrocarbon and additive with effluent in a selected effluent temperature regime and efficiently remove said pollutants, and atomizing said calcium-containing compound with said hydrocarbon gas atomizing medium to inject said fuel lean region of said effluent, for providing a calcium sorbent for reaction with $SO_x$ in said effluent, from a single stage such that said hydrocarbon and calcium containing compound are simultaneously mixed with said effluent in a selected temperature regime and in a manner to form a locally fuel-rich region about said compound, said injection occurring in the temperature regime of about 1700° F. to 2800° F.

14. The method of claim 1 or 2 wherein said additive is in the liquid phase when received by said atomizing nozzle.

15. The method of claim 1 wherein said hydrocarbon is about 5 to 15% by weight of said mixture.

16. The method of claim 2 wherein said mixture is injected into said effluent and wherein said effluent has a temperature greater than about 2300° F.

17. The method of claim 2 comprising reducing the amount of $SO_x$ pollutants in the effluent by:

injecting in said fuel lean region of said effluent calcium acetate in combination with said hydrocarbon by atomizing calcium acetate with said hydrocarbon, said injection occurring in an effluent temperature regime of about 1700° F. to 2800° F.

* * * * *